United States Patent Office 2,933,370
Patented Apr. 19, 1960

2,933,370

PROCESS FOR SEPARATING NICKEL AND ZINC FROM ACIDIC AQUEOUS SOLUTION CONTAINING NICKEL, ZINC, AND COBALT

Raphael F. Matson, New Orleans, La., assignor to Freeport Sulphur Company, New York, N.Y., a corporation of Delaware No Drawing. Application October 30, 1956
Serial No. 619,118

8 Claims. (Cl. 23—50)

This invention relates to a process for the separation of nickel from cobalt, and more particularly to the separation of nickel and zinc from cobalt by precipitation from aqueous solutions of mixtures of salts of such metals, either alone or in the presence of salts of other metals. The invention is especially applicable to the treatment of solutions containing cobalt, nickel and zinc in the form of their sulfates along with ammonium sulfate.

In the Marcel De Merre Patent No. 2,671,712, a process for separating such metals is disclosed involving the addition of cobalt and sulfur or equivalent element to an aqueous acidic solution of salts of nickel and cobalt, along with salts of any number of other metals of which zinc is one, heating the mixture under the acidic conditions until nickel precipitates, and finally separating the precipitated nickel from the cobalt which remains in solution along with any zinc present.

It has now been determined that the presence of zinc in appreciable amounts in the cobalt-nickel solution inhibits the precipitation of the nickel thus leaving an excessive amount of the same in the recovered cobalt. Accordingly, one object of the invention is to increase the proportion of nickel precipitated from such mixture, thereby to provide a cobalt product with less nickel content and to increase the amount of nickel precipitated from the cobalt solution. It has also been found that it is more advantageous in subsequent operations to precipitate the zinc along with the nickel.

The practice of the present invention involves a rather simple but critical change in the procedures disclosed in the patent, namely—the conduct of the heating and precipitating reaction in the absence of air or oxygen, suitably through the provision of an inert atmosphere or through the use of a completely filled, closed reaction vessel, whereby the zinc precipitates along with the nickel leaving the cobalt free of zinc and low in nickel content.

In the process of the patent, the zinc content is said to remain in solution, but it now appears that the zinc precipitates along with the nickel (probably in the form of its sulfide) but rapidly oxidizes into zinc sulfate and goes back into solution. When the zinc content of the solution being treated is present in appreciable amounts, its oxidation and resolution appears to interfere with and lessen the amount of the nickel precipitation. In the practice of the present invention, the exclusion of oxygen from the reaction zone apparently prevents the oxidation of the zinc compound formed, thereby leading to an increase in the proportion of the nickel precipitated out of the cobalt-nickel solution.

The process of the invention is generally applicable to the cobalt-nickel salt solutions containing zinc defined in the above-mentioned patent and may utilize the same reactants, proportions, reaction conditions and procedures, with the exception that the reaction is carried out under conditions which exclude any oxidation, as in a nonoxidizing atmosphere. In the process of the patent, aqueous solutions having a pH value of from about 1 to 5.5 containing nickel and cobalt sulfates or chlorides together with minor amounts of soluble salts of any of the metals, iron, zinc, manganese, copper, lead and magnesium, which additional salts are said not to interfere with the nickel separation are treated by adding, advantageously in large excess, finely divided metallic cobalt and finely divided sulfur or other compounds such as arsenic, antimony, selenium and tellurium at the acidity hereinbefore indicated and by heating the mixture to a temperature of from 85° C. to the boiling point after which the precipitate containing the bulk of the nickel is separated from the solution containing the cobalt and zinc. As hereinbefore stated, the conduct of the process in an inert atmosphere causes the zinc to precipitate out and remain with the nickel as well as any copper and lead that might be in the solution.

Experimentation indicates operability of the process of the invention under substantial variation of all the factors involved. Included among the variations tested were feed solutions having 0.01 to 20 grams zinc with 40 grams cobalt, and 4 grams nickel, per liter of solution, all being present in sulfate form. As to acidities, pH values of 2 to 4, temperatures of 65° to 90° C. and heating times of 30 to 885 minutes were employed. The minimum amount of metallic cobalt found necessary is approximately equivalent to the nickel plus zinc content, this amount depending somewhat on the ratio of nickel to zinc. The greater the amount of metallic cobalt used, the more complete the precipitation of the nickel. The most beneficial temperature appeared to be 80° to 90° C. and the time more than about 100 minutes. The addition of a wetting agent also improved the reaction by providing a better contact of liquid and elemental sulfur. The pH value of the solution could be maintained constant during the reaction by the addition of small amounts of sulfuric acid. Mechanical stirring can be used and oxygen may alternatively be excluded by operating in a pressure vessel below an atmosphere of any gas which does not interfere with the result herein described.

Example

A solution containing 40 grams of cobalt, 4 grams of nickel, 2 grams of zinc and 120 grams of ammonium sulfate per liter, the metals all being in the sulfate form, was treated by adding finely divided metallic cobalt in a quantity one and one-half that of the combined nickel and zinc content and finely divided sulfur in a quantity 15 times that of the nickel plus zinc content, after which the mixture at a pH of 4 was heated to 90° C. Nitrogen gas was then bubbled through the reaction mixture in such manner as to agitate the same and completely exclude oxygen from contact with the liquid. After 120 minutes, a product was obtained which on filtration yielded a precipitate containing 75% of the nickel and 50% of the zinc. The cobalt to nickel content of the filtrate solution was 150 to 1.

It should be understood that the instant invention is not limited to the specific details set out herein but that it extends to all equivalent materials, procedures and conditions which will occur to those skilled in the art upon consideration of the terms used herein, and the scope of the claims appended hereto.

I claim:

1. In the precipitation of nickel from acidic aqueous solutions containing in solution salts of cobalt, nickel and zinc, by means of heat and of added finely divided metallic cobalt and sulfur, the process of separating zinc along with the nickel which comprises, conducting said heating under exclusion of oxygen from contact with the solution and separating the resulting precipitated nickel and zinc compounds from the cobalt which remains in solution.

2. In the precipitation of nickel from acidic aqueous solutions containing in solution salts of cobalt, nickel and zinc in the form of their soluble salts selected from the group consisting of sulfates and chlorides, by means of heat and of added finely divided metallic cobalt and sulfur, the process of separating zinc along with the nickel which comprises, conducting said heating in an inert atmosphere and separating the resulting precipitated nickel and zinc compounds from the cobalt which remains in solution.

3. The process of claim 1 wherein nitrogen is continuously bubbled through the reacting mixture.

4. In the precipitation of nickel from aqueous sulfuric acid solutions of sulfate salts of cobalt, nickel and zinc, by means of heat and of added finely divided metallic cobalt and sulfur, the process which comprises, conducting said heating under exclusion of oxygen from contact with the solution and separating the resulting precipitated nickel and zinc compounds from the cobalt which remains in solution.

5. In the precipitation of nickel from acidic aqueous solutions containing in solution salts of cobalt, nickel and zinc in an amount inhibiting precipitation of part of the nickel, by means of heat and of added finely divided metallic cobalt and sulfur, the process of separating zinc along with the nickel which comprises, conducting said heating under exclusion of oxygen from contact with the solution and separating the resulting increased proportion of precipitated nickel and zinc compounds from the cobalt which remains in solution.

6. In the precipitation of nickel from acidic aqueous solutions containing in solution salts of cobalt, nickel and zinc in the form of their soluble salts selected from the group consisting of sulfates and chlorides, by means of heat and of added finely divided metallic cobalt and sulfur, the process of separating zinc along with the nickel which comprises, conducting said heating in a substantially completely filled closed reaction vessel whereby oxygen is excluded from contact with the solution and separating the resulting precipitated nickel and zinc compounds from the cobalt which remains in solution.

7. In the precipitation of nickel from acidic aqueous solutions containing in solution salts of cobalt, nickel and zinc in the form of their soluble salts selected from the group consisting of sulfates and chlorides in an amount inhibiting precipitation of part of the nickel, by means of heat and of added finely divided metallic cobalt and sulfur, the process of separating zinc along with the nickel and of increasing the proportion of the nickel precipitated, which comprises, conducting said heating in a substantially completely filled closed reaction vessel whereby oxygen is excluded and separating the resulting precipitated nickel and zinc compounds from the cobalt which remains in solution.

8. In the precipitation of nickel from acidic aqueous solutions containing in solution salts of cobalt, nickel and zinc in the form of their soluble salts selected from the group consisting of sulfates and chlorides in an amount inhibiting precipitation of part of the nickel, by means of heat and of added finely divided metallic cobalt and sulfur, the improvement which consists in conducting said heating under conditions free of any gases, including oxygen, reactive with the metal salts present and separating the resulting increased proportion of precipitated nickel and zinc compounds from the cobalt which remains in solution.

References Cited in the file of this patent

UNITED STATES PATENTS

| | | |
|---|---|---|
| 2,476,284 | Churchward et al. | July 19, 1949 |
| 2,671,712 | De Merre | Mar. 9, 1954 |